(12) United States Patent
Zafred et al.

(10) Patent No.: US 7,485,386 B2
(45) Date of Patent: Feb. 3, 2009

(54) FLEXIBLE CERAMIC GASKET FOR SOFC GENERATOR

(75) Inventors: Paolo Zafred, Murrysville, PA (US); Thomas Prevish, Trafford, PA (US)

(73) Assignee: Siemens Energy, Inc., Orlando, FL (US)

( * ) Notice: Subject to any disclaimer, the term of this patent is extended or adjusted under 35 U.S.C. 154(b) by 468 days.

(21) Appl. No.: 10/854,915

(22) Filed: May 27, 2004

(65) Prior Publication Data

US 2005/0266288 A1   Dec. 1, 2005

(51) Int. Cl.
*H01M 8/10* (2006.01)
(52) U.S. Cl. ............................... 429/32; 429/30; 429/34
(58) Field of Classification Search .................. None
See application file for complete search history.

(56) References Cited

U.S. PATENT DOCUMENTS

| | | | |
|---|---|---|---|
| 3,619,144 A * | 11/1971 | Bawa et al. ................. | 422/193 |
| 4,395,468 A | 7/1983 | Isenberg | |
| 4,515,866 A * | 5/1985 | Okamoto et al. ............ | 428/614 |
| 4,888,254 A | 12/1989 | Reichner | |
| 4,983,471 A | 1/1991 | Reichner et al. | |
| 5,200,279 A | 4/1993 | Draper et al. | |
| 5,244,752 A * | 9/1993 | Zymboly ...................... | 429/31 |
| 5,573,867 A | 11/1996 | Zafred et al. | |
| 5,753,383 A * | 5/1998 | Cargnelli et al. ............. | 429/13 |
| 6,221,522 B1 | 4/2001 | Zafred et al. | |
| 6,399,232 B1 * | 6/2002 | Eshraghi ...................... | 429/27 |
| 6,656,623 B2 | 12/2003 | Holmes et al. | |
| 2002/0110716 A1 * | 8/2002 | Holmes et al. ................ | 429/31 |
| 2003/0082423 A1 * | 5/2003 | Kushibiki et al. ............. | 429/26 |
| 2005/0008909 A1 * | 1/2005 | Kaye et al. .................... | 429/20 |

\* cited by examiner

*Primary Examiner*—Patrick Ryan
*Assistant Examiner*—Cynthia Lee

(57) ABSTRACT

A solid oxide fuel cell generator (10) contains stacks of hollow axially elongated fuel cells (36) having an open top end (37), an oxidant inlet plenum (52), a feed fuel plenum (11), a combustion chamber (94) for combusting reacted oxidant/spent fuel; and, optionally, a fuel recirculation chamber (106) below the combustion chamber (94), where the fuel recirculation chamber (94) is in part defined by semi-porous fuel cell positioning gasket (108), all within an outer generator enclosure (8), wherein the fuel cell gasket (108) has a laminate structure comprising at least a compliant fibrous mat support layer and a strong, yet flexible woven layer, which may contain catalytic particles facing the combustion chamber, where the catalyst, if used, is effective to further oxidize exhaust fuel and protect the open top end (37) of the fuel cells.

7 Claims, 3 Drawing Sheets

FLEXIBLE CERAMIC GASKET FOR SOFC GENERATOR

GOVERNMENT CONTRACT

The Government of the United States of America has rights in this invention pursuant to Contract No. DE-FC26-97FT34139, awarded by the U.S. Department of Energy.

FIELD OF THE INVENTION

The invention relates to novel composite positioning gaskets used to separate the combustion chamber of a solid oxide electrolyte fuel cell generator, hereinafter "SOFC generator", from the other regions of the SOFC generator, such as the recirculation zone or stack region.

BACKGROUND OF THE INVENTION

High temperature, solid oxide electrolyte fuel cell generator apparatus and fuel cell configurations are well known, and taught, for example, in U.S. Pat. No. 4,395,468 (Isenberg). There, feed fuel, either $H_2$+CO, or previously reformed natural gas, is fed into the apparatus at one end and flows parallel to exterior fuel electrode surfaces of elongated tubular fuel cells. Spent fuel is combusted with spent oxidant in a separate combustion chamber and then exits the apparatus. In this patent a power generation chamber extends between an end wall of the generator housing and a porous, stiff positioning/separator board on the other side of which is a combustion chamber containing open ended fuel cells into which air/oxidant feed tubes are passed. The combustion chamber preheats incoming air/oxidant passing through the air/oxidant feed tubes and into the interior of tubular closed end fuel cells. Other generator designs utilize an open end fuel cell structure, for example, U.S. Pat. No. 5,200,279 (Draper et al.), or flattened rather than tubular fuel cells, for example, U.S. Pat. No. 4,888,254 (Reichner).

In later SOFC embodiments, some spent fuel from the recirculation chamber between the combustion chamber and the power generation chamber, as shown in FIG. 2 of U.S. Pat. No. 4,983,471 (Reichner and Dollard) was recirculated either directly from the recirculation chamber or from openings in the power generation chamber. A similar arrangement is shown in FIG. 4 of U.S. Pat. No. 5,573,867 (Zafred et al.), where some spent fuel captured in a spent fuel recirculation chamber is recirculated to an ejector to mix with fresh feed fuel. The fuel cell positioning board, between a combustion chamber and a spent fuel recirculation chamber is more clearly shown in FIG. 2 of U.S. Pat. No. 6,656,623 B2 (Holmes et al). In some instances, the open end of the fuel cell, located in the combustion chamber, was vulnerable to reduction by spent fuel. Originally, this was solved by Zafred et al., in U.S. Pat. No. 6,221,522 B1, by utilizing open fuel cell end sleeves, but this added to costs and did not completely solve the problem.

Originally, upper and lower positioning boards were designed to function as loose separators between the power generation fuel cell stack region, the spent fuel recirculation plenum/chamber and the combustion chamber, and also as open-end cell positioning boards. Typical board material was a low density, vacuum-formed fibrous ceramic board, which was subsequently machined to obtain loose clearance holes for the fuel cells and flow holes through the ligament between adjacent cells.

However, inadequate sealing tended to cause some fuel and temperature mal-distribution. Also, differential axial thermal expansion between the cells and the positioning boards, could lead to cells "grabbing" the boards during generator shut-downs and potentially breaking them. Additionally, the use of initially stiff positioning boards required 100% location mapping using a very expensive laser mapping technique which generates a series of XY coordinates for each cell position. These data are inputted into a milling machine which machines the final custom hole pattern to precisely match the irregular cell pattern configuration.

What is needed are positioning boards which are both flexurally strong yet soft and compliant and also cost-effective. Furthermore, they should have specific permeation characteristics to allow only a certain fraction of spent fuel to flow through to the combuster chamber while allowing a greater fraction to recirculate through the stack. They also should be initially flexible during insertion into the generator and should also somehow have the capability of protecting the open end of the fuel cell in the combustion chamber from localized burning of hydrogen during transient operating conditions where normal temperatures of 1100° C. can rise for a short time to as high as 1400° C. It is a main object of this invention to provide novel positioning boards, especially those interfacing with the combustion chamber, where the boards meet strong yet compliant requirements and somehow are effective to protect fuel cell open ends during short transient conditions.

SUMMARY OF THE INVENTION

The above needs/objects are met and problems solved by providing a solid oxide fuel cell generator comprising: stacks of hollow, axially elongated fuel cells having at least one open top above an electrochemically active portion, which can react and operate on feed oxidant and feed fuel to generate electricity; an oxidant inlet plenum supporting oxidant feed tubes; a feed fuel inlet plenum; and a combustion chamber for receiving reacted oxidant/spent fuel, located above the active portion of the fuel cells and below the oxidant inlet plenum and containing the at least one open top of the fuel cells where the combustion chamber is defined by the oxidant inlet plenum and a semi-porous fuel cell positioning gasket, which gasket allows permeation of spent fuel into the combustion chamber; all surrounded by insulation and all within an outer generator enclosure, and where the fuel cell positioning gasket has a laminate structure comprising at least a compliant fibrous mat sealing layer and a flexible, woven layer, the laminate structure closely gasketing the fuel cells so that spent fuel permeation into the combustion chamber is controlled. This "control" can be through use of measured porosity within the gasket to provide just a slightly lower pressure in the combustion chamber vs. the chamber opposite the combustion chamber. Tubular fuel cells are much preferred but elongated/flattened hollow cells and other types are possible.

This invention also resides in a solid oxide fuel cell generator comprising: stacks of hollow tubular, axially elongated fuel cells having at least one open top above an electrochemically active portion, which can operate on feed oxidant and feed fuel to generate electricity; an oxidant inlet plenum supporting oxidant feed tubes; a feed fuel inlet plenum; a combustion chamber for receiving reacted oxidant/spent fuel, located above the active portion of the fuel cells and below the oxidant inlet plenum and containing the at least one open top of the fuel cells where the combustion chamber is defined by the oxidant inlet plenum and a fuel cell positioning gasket, which gasket allows permeation of spent fuel into the combustion chamber; and a fuel recirculation chamber, below the combustion chamber, said fuel recirculation chamber defined at least by the fuel cell positioning gasket; all surrounded by insulation and all within an outer generator enclosure, where the oxidant feed tubes have an open end in the oxidant inlet plenum and which oxidant feed tubes pass through the combustion chamber and into the at least one open fuel cell top within the combustion chamber, and where the fuel cell positioning gasket seals around the fuel cells to control gas flow into the combustion chamber and has a laminate structure comprising at least a compliant fibrous mat layer and a flexible woven layer facing the combustion chamber. The woven layer can contain catalytic nickel.

The fibrous mat can also be laminated to a flexible, woven, bottom non-catalyzed layer to form a three layer composite gasket sheet. The flexible woven layer contains high purity alumina fibers, which matrix, when facing the combustion chamber, may be impregnated with nickel slurry to form a catalytic mat, where hydrogen fuel combustion would preferably occur, thus protecting the open ends of the cells from hot spots in the combustion chamber. The composite assembly is very flexible, even in the initial state, allowing ease of installation over bundle rows with realistic tolerances in cell pitch without resorting to expensive mapping and custom manufacturing. This compliance effectively seals against the fuel cells as a gasket which in most instances prevents spent fuel getting through gaps between the gasket and fuel cells and burning near the open fuel cell ends. If effective, nickel catalyst is not needed.

Another embodiment of the invention resides in a plurality of fuel cell stacks in a fuel cell generator, the stacks containing a plurality of axially elongated fuel cells all supported at least in part by a semi-porous gasket, where the fuel cells are tightly disposed through perforations in the gasket and at least one end of the fuel cells is disposed in a combustion chamber adjacent the gasket, said gaskets having flexible initial form but made of material that may stiffen at temperatures over 1000° C., said gasket comprising at least a compliant fibrous mat support layer, and a flexible woven layer.

The compliant gasket, even when later baked/cured/sintered effectively absorbs mechanical and thermal loads induced by differential thermal expansion of the SOFC cells and the adjacent structures during generator operation, and maintains the important range of allowable pressure drop which has now been found in this environment to be between about 0.25-2.0 inches of water, to control spent fuel permeation through the gasket. Additionally, the simple fabrication of the fuel cell positioning gasket makes it ideal for low cost production. A lower positioning board if used, can be of the same construction or standard stiff board construction. The fuel cells can be closed or open ended, tubular or of flattened design. Thus, this provides a non seal-less design.

BRIEF DESCRIPTION OF THE DRAWINGS

The above and other advantages of this invention will be more apparent from the following description in view of the drawings, where.

DESCRIPTION OF THE PREFERRED EMBODIMENT

Figure 1:
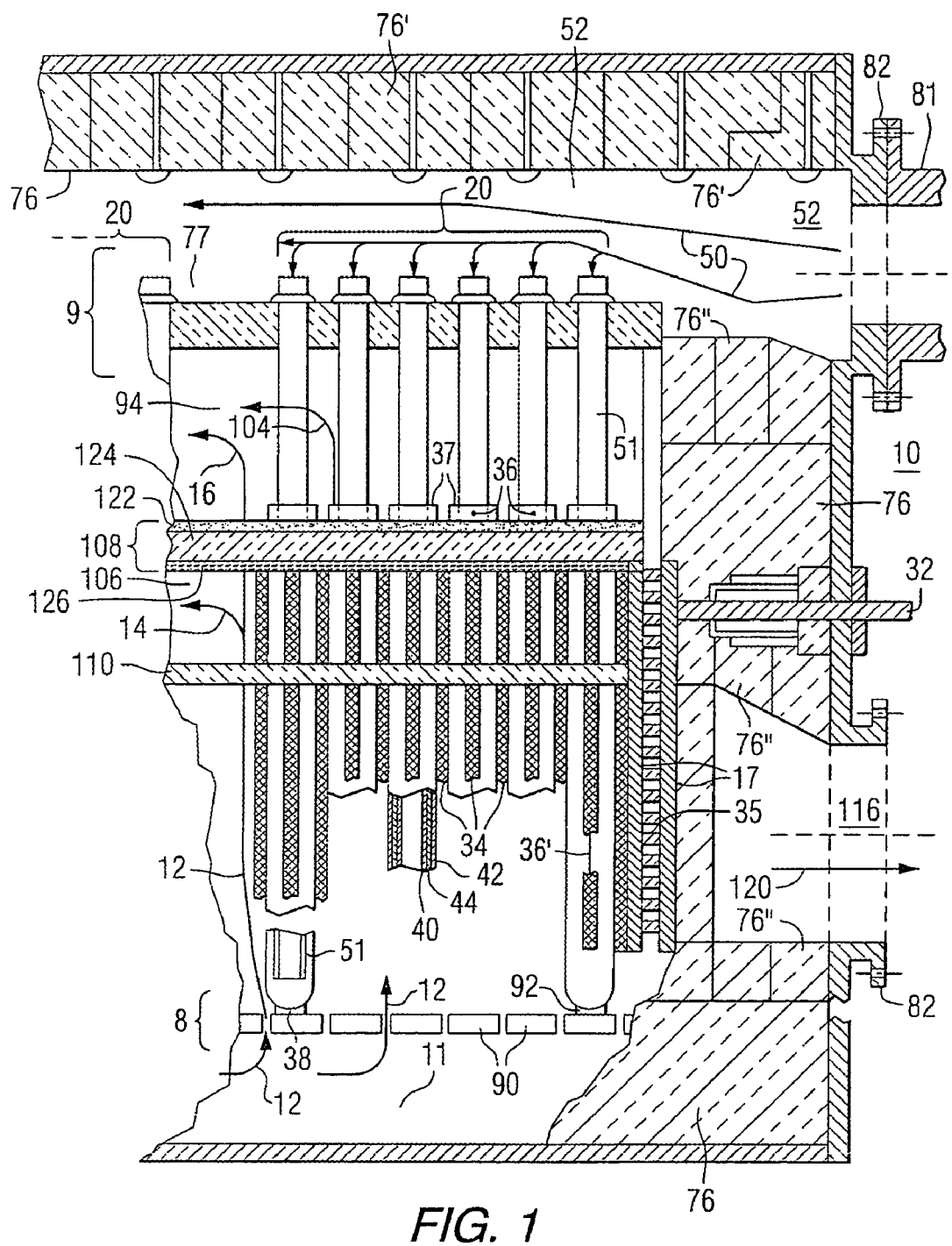
FIG. 1, which best shows the invention, is a side view in section of one embodiment of the fuel cell generator of the invention, utilizing closed end fuel cells, showing fuel cell gasket and optional lower fuel cell positioning boards as well as the oxidant inlet plenum.

Referring now to FIG. 1, solid oxide fuel cell generator 10 is shown. It contains a plurality of fuel cell stacks, generally designated as number 20, of fuel cells 36. Each fuel cell is in hollow, axially elongated form, preferably tubular as shown, having an open top end 37 and, as shown in this embodiment, a closed bottom end 38. Use of dual open ended fuel cells is also an option. The fuel cells contain interior self supporting air electrodes 40, usually of a doped $LaMnO_3$ ceramic, exterior fuel electrodes 42, usually of a nickel zirconia cermet, with solid electrolyte 44, usually comprising yttria stabilized zirconia, therebetween, as shown by the one fuel cell shown. The fuel cells operate on a feed oxidant 50, usually pre-heated air, and reformed fuel 12, usually internally or externally reformed to provide $H_2$+CO anode gas. The fuel passes from a bottom fuel inlet plenum 11, through fuel entry boards 90 having holes therethrough, at the bottom 8 of the fuel cell generator. These fuel entry boards can also help support the fuel cell bottoms 38 as at point 92.

An oxidant inlet plenum 52 can be formed by enclosing insulation 76, 76' and 76" and includes an oxidant feed tube support board 77, having holes for oxidant feed tubes 51 therethrough, which member 77 is located at the top portion 9 of the fuel cell generator. Below the oxidant feed tube support board 77 and above the fuel cells 36 is a reacted or spent oxidant/reacted or spent fuel exhaust combustion chamber 94 useful to heat incoming feed oxidant in the oxidant feed tubes 51. In operation, oxidant flows down the oxidant feed tubes 51 into the open end 37 of fuel cells 36, to the bottom 38 of the fuel cells where it reverse flows, contacting the inner air electrode 40, reacts to provide depleted oxidant 104 which exits the open end 37 of the fuel cells into oxidant/fuel exhaust combustion chamber 94. The reformed fuel 12 passes outside of the fuel cells, 36, contacting exterior fuel 14 some of which exits into fuel recirculation chamber 106 and depleted fuel 16 which exits into reacted oxidant/fuel exhaust combustion chamber 94.

The fuel cells 36 are partly supported by fuel cell positioning gasket 108 and optional lower fuel cell positioning board 110, which can define the fuel recirculation chamber 106, as shown in this embodiment. The fuel cell positioning gasket 108 is usually spaced by vertical supports, not shown. The oxidant feed tubes 51 pass through combustion chamber 94 into the open center of the fuel cells. Insulation 76, most of it in bulk ceramic fiber form, about 70% porous by volume, surrounds all these components which are enclosed by a metallic, usually, steel canister, providing the pressure boundary of the system. Exhaust outlet is shown as 116, with exhaust flow shown as 120.

The fuel cell positioning gasket 108 is a composite/laminate of at least two layers, top layer 122 and base layer 124. Optional bottom layer 126 is also shown in FIG. 1. The top layer 122 is preferably a woven textile matrix comprised of high purity alumina fibers which, optionally, can be impregnated with nickel particles or nickel oxide slurry to form a catalytic mat close to spent fuel combustion in the generator chamber 94.

The composite fuel cell positioning gasket 108 is designed to facilitate the assembly of the generator stack, lower the cost of the fuel cell generator, and ultimately offer a viable solution towards producing highly efficient SOFC systems. The positioning gasket 108 is designed to function as a semi-porous partition barrier between, for example, a recirculation chamber 106 and a combustion chamber 94 of the SOFC fuel cell generator 10. The compliant layer 124 is designed to seal against the fuel cells effectively.

The impregnated top woven mat 122 can be designed to help combust the unreacted fuel in the combustion chamber 94, limit the peak combustor and exhaust exit temperature to acceptable values. The essential requirements met by the high temperature ceramic composite fuel cell positioning gasket 108 include: utilization of stable, continuous alumina fibers; a semi-porous matrix, either about 90 vol. % to 99 vol. % porous or having higher density material with flow holes distributed through the gasket in any suitable configuration, to allow controlled spent/depleted fuel gas permeation/diffusion; compliance to accommodate variable cell bundle pitch; flexibility to allow for ease of installation; resistance to both oxidizing and reducing atmosphere; long term stability under severe operating conditions as high as 1400° C.; mechanical strength under thermal loads and pressure transients; and cost effectiveness.

Figure 2:
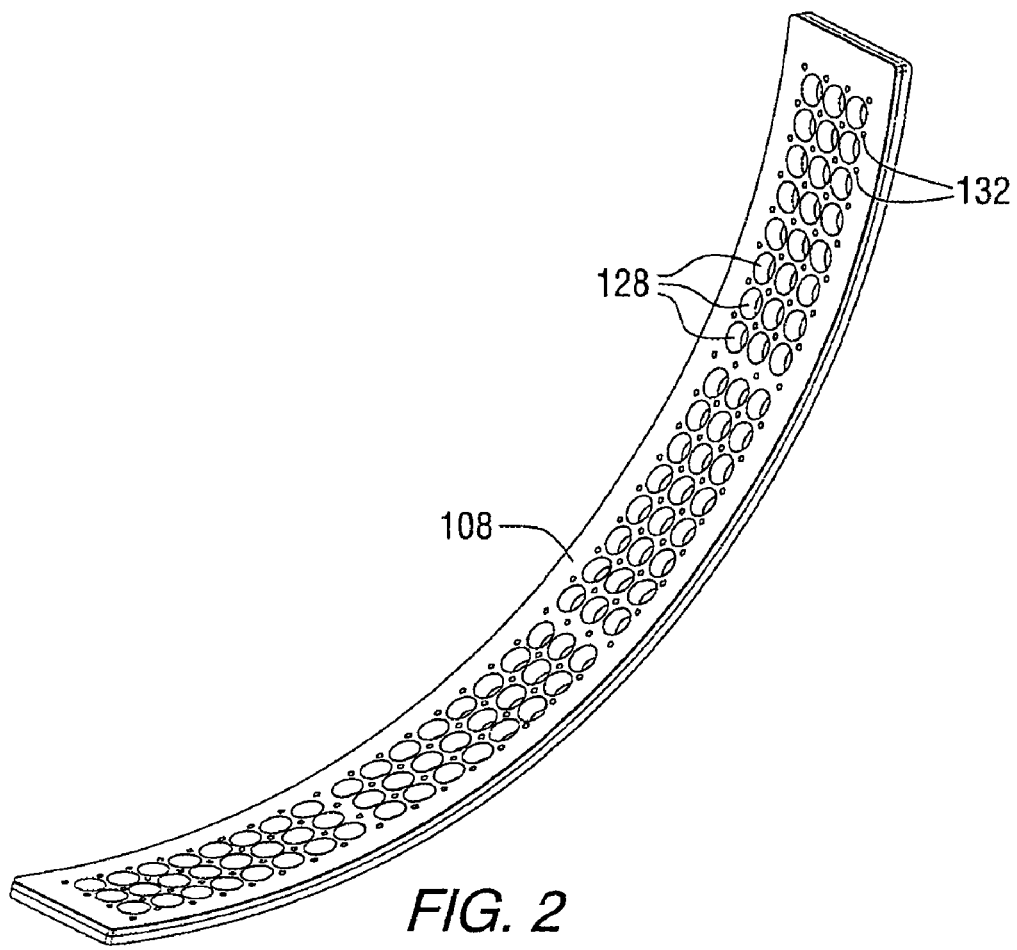
FIG. 2 is a three dimensional view of a flexible bendable fuel cell positioning gasket laminate.
Figure 3:
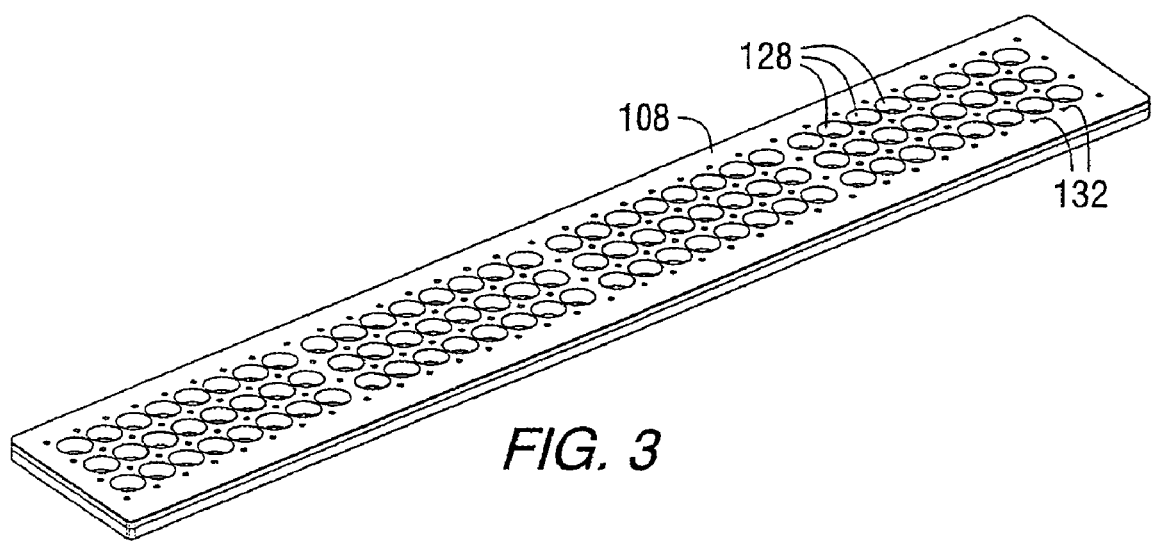
FIG. 3 is a three dimensional view of a still flexible/baked fuel cell positioning gasket laminate.
Figure 4:
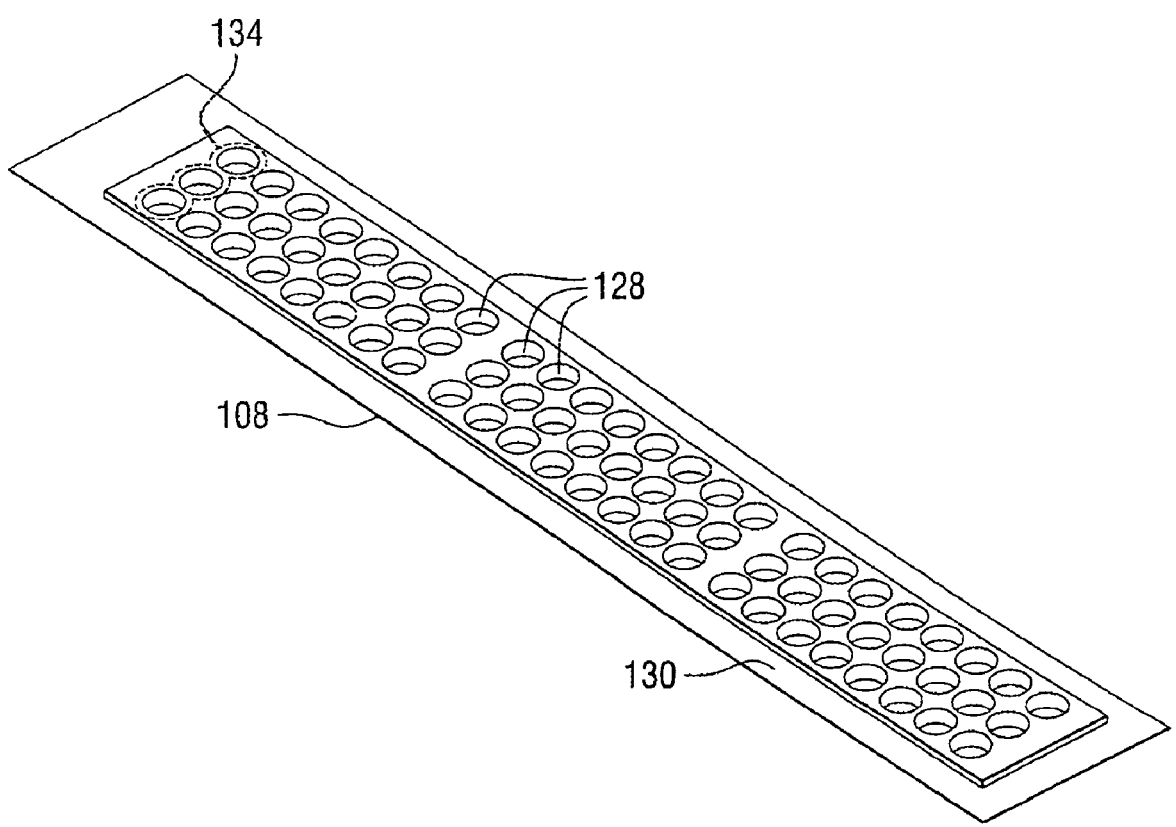
FIG. 4 is a three dimensional view of a "sewn pillow type" configuration embodiment of a fuel cell positioning gasket.

The composite fuel cell positioning gasket 108 has perforations therethrough shown in FIGS. 2-4, having inner surface/circumference against which the outer surface/circumference of the fuel cells fit tightly. The gasket may be comprised of sinterable material such as a pure alumina fiber, a matrix of discontinuous fiber, 95-97 wt. % alumina, 3-5 wt. % silica and an optional pure alumina bond phase to bond/cement the layers together. Bonding the facings 122 and 126 to the core material 124 is important in the overall integrity of the sandwich gasket panel 108. High temperature thread can also be used around the perforation and/or along the edges of a pillow type gasket, to effect bonding of the layers. The overall composition of the composite gasket positioning board is about 60 wt. % to 98 wt. % alumina and 2 wt. % to 40 wt. % silica. Less stringent requirements on material purity may be adopted to use up to 40 wt. % silica, providing that no cell voltage degradation is detected as a result of long-term running in a fuel cell environment. Usually, the limit on silica is up to about 10 to 30 wt. % silica content.

The flexible ceramic gasket 108 is configured to accommodate a range of SOFC design conditions requiring pressure drops between the recirculation chamber 106 and combustion zone 94 of 0.25 inches of water to 2.0 inches of water. The gasket 108 can be tailored to meet this by utilizing materials with typical porosities of 90-99 vol. % and allowing the gas to diffuse evenly through the board, or by using higher density materials and flow holes in the range of 0.070 inches to 0.100 inches (0.178 cm-0.254 cm). In either case, the flexible ceramic gasket will include holes through which the fuel cells 36, of typical diameter 0.87 inches (2.21 cm), protrude. These holes are undersized to ensure the gasket seals effectively against the fuel cells. The gasket is constructed of flexible ceramic material that effectively seals against the fuel cells while controlling the flow rate, flow distribution, and pressure drop between the recirculation and combustion chambers.

During normal operation the composite gasket fuel cell positioning board 108 is exposed to temperatures up to 1100° C. in the combustion atmosphere of chamber 94 containing spent fuel which typically contains 50% water vapor, 14% hydrogen and 28% carbon dioxide. However, transient operating conditions may significantly increase the temperature to 1300° C.-1400° C. as a result of hydrogen oxidation in the combustion zone, 94. To protect the open ends of the cells from localized burning of hydrogen, the woven top layer 122 is or can be impregnated with a slurry, preferably nickel oxide which would adhere to the woven matrix after curing. The nickel impregnation process applied to a woven matrix very importantly promotes flameless catalytic combustion of spent fuel in combustion chamber 94.

A preferred configuration of the composite assembly positioning gasket 108 includes a composite single strip spanning a 3-bundle row assembly. This design includes a central perforated section for installation over the bundles, holding/supporting the fuel cells and stack bundles, where the fuel cells fit tightly through the perforations 128 of FIGS. 2, 3 and 4. Typical dimensions of the composite gasket positioning board are: Perforated width 3.25 in. (8.25 cm); overall length 29.75 in. (75.6 cm- to accommodate 3 groups of 3×8 hole patterns); thickness ⅛ in. to ½ in. (0.32 cm to 1.27 cm).

The design can be a stitched, "pillow" style, shown in one embodiment in FIG. 4, with central perforated section, with perforations 128, where any appropriate configuration of stitching can be used so long as it integrates the composite, for example stitching 134, is shown at only one location for the sake of simplicity. Also, a plain peripheral double layer fabric strip 130 is used to retain it between adjacent boards, or an outer rigid frame with two offset slots designed to capture and retain the woven inserts is used. Here, no flow holes are needed, as gas permeates through the fabric 130. The outer frame structure (not shown) is made of high purity alumina fibrous insulation material. A flexible, positioning board is shown in FIG. 2, with perforations 128, and gas flow holes 132, whose dimensions were detailed earlier. The gasket can be used with or without these gas flow holes 132, naturally it is advantageous and less expensive to rely solely on the gasket material to control flow. This can easily be positioned within the fuel cell bundles. A baked/cured product of FIG. 2 is shown as FIG. 3 in cured form having a rigid top and compliant core.

Two of the most original aspects of the flexible ceramic gasket 108 are its capabilities to seal against the cells to ensure no unwanted leakage occurs, while concurrently controlling the flow rate of the spent fuel electrochemically consumed. The first feature is accomplished by utilizing the strength and flexibility of the woven fabric material to securely retain the alumina fiber inner mat, which is cut smaller than the cell diameters to ensure adequate sealing. The second feature is controlled by varying the thickness and or type of alumina fiber inner mat and/or the weave of the fabric, to tailor/control the flow rate or pressure drop across the gasket. The accompanying Table 1 illustrates this behavior, where for a desired flow rate, variations in the fabric and inner mat provide a wide range of pressure drop, compared to conventional top or bottom rigid boards currently in use in SOFC generators, which require precision machining of numerous flow holes (typically 268 flow holes through the ligament between adjacent cells, 0.070 to 0.096 inches in diameter; 0.178 to 0.243 cm), and where gas leakage between the board and fuel cell have always been the accepted norm. The appropriate pressure drop for efficient operation of this gasket positioned next to the combustion chamber is 0.25-2.0 inches of water, preferably 0.35 to 1.75 inches of water, so construction must be managed to be within that range.

TABLE 1

| Configuration | Pressure Drop [inches of water] | Flow Rate [liters/min] |
|---|---|---|
| Conventional Positioning Board with 0.070" and 0.096" flow holes | 0.25 | 34 |
| 2 layers Woven Fabric #1 + Alumina Fiber Mat A | 0.01 | 34 |
| 2 layers Woven Fabric #1 + Alumina Fiber Mat B | 0.7 | 34 |
| 2 layers Woven Fabric #2 + Alumina Fiber Mat C | 2 | 34 |

Compliant and complete sealing of the flexible ceramic gasket against the exterior of the fuel cell is a very important feature of this invention, because it eliminates the undesirable effect of radial gap size and cell eccentricity within the clearance hole. Eccentricity between the cell outside diameter and inside diameter of the clearance hole introduces a wide variation of flow through former solid type positioning boards causing flow mal-distributions which play a big role in stack temperature, all solved by the intimate contact of the gaskets with the outside of the fuel cells as described herein.

Referring back to FIG. 1, power leads 32, are shown, for the sake of simplicity on the side where oxidant inlet plenum 52 and exhaust outlet 116 are located. They are, however, electrically connected to each parallel bus bars 17 and to the fuel cells 36, through flexible power take-off connectors 35, which contact each fuel cell. The power leads 32 are transverse to the axis 36' of the fuel cells and are embedded in insulation material. As shown, external ducting 81 is kept to a minimum by integral entrance and exit conducts 82.

EXAMPLE

Prototypes of two potential gasket positioning board styles with square-pitched 3×8 hole arrays were made. The first was a pillow type gasket, with undersized holes for the cells punched out, then sewn with high-temperature ceramic thread to consolidate the gasket composite and prevent unraveling. The second was a quilted gasket, with cell holes cut using a laser. Both would be useful and accomplish all objectives of the invention, especially when the top would be impregnated with catalytic nickel oxide. To control pressure drop through the gasket, a number of parameters can be varied to optimize the consistency and the porosity of the matrix. Gas permeability can be controlled by using low-density ceramic fiber blankets or medium density papers or felts. The preferred method of fabrication consists in stitching a 3×8 hole pattern by the continuous intertwining of thin ceramic thread through the gasket thickness, relying on the uniformity of the gasket permeability rather than manufactured flow holes to promote uniform burning above the gasket.

An alternative method used a filament winding process, which simultaneously deposited both continuous and discontinuous fibers on a fixture consisting of a 3×8 array of mandrels of the same diameter as the fuel cell. This method eliminates the need to perform a secondary hole punching operation that may cause fiber thinning/breakage in the perforated gasket ligaments. One major advantage of this method was that the gasket was not machined but it was integrally woven to a final net shape. Additional advantages of this woven construction include ease of assembly, adaptability to irregular cell pitch, commonality between parts, better serviceability and gasket quick-replacement capability.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalent thereof.

What is claimed is:

1. A solid oxide fuel cell generator comprising:
   (1) stacks of hollow, axially elongated fuel cells, arranged in bundle stacks, each cell having at least one open top above an electrochemically active portion, which can react and operate on feed oxidant gas and feed hydrogen fuel gas to generate electricity;
   (2) an oxidant inlet plenum supporting oxidant feed tubes;
   (3) a feed fuel inlet plenum;
   (4) a combustion chamber for receiving and combusting reacted oxidant/spent fuel gases, located above the electrochemically active portion of the fuel cells and below the oxidant inlet plenum and containing the at least one open top of the fuel cells, said at least one open top being subject to localized burning, where the combustion chamber is defined by the oxidant inlet plenum, and a fuel cell positioning gasket, which gasket allows permeation of spent fuel gas into the combustion chamber; and
   (5) a fuel recirculation chamber, below the combustion chamber, said fuel recirculation chamber defined at least by the fuel cell positioning gasket; all surrounded by insulation and all within an outer generator enclosure, where the oxidant feed tubes have an open end in the oxidant inlet plenum and which oxidant feed tubes pass through the combustion chamber and into the at least one open fuel cell top within the combustion chamber,
   where the fuel cell positioning gasket closely gaskets the fuel cells while concurrently controlling the flow rate of the spent fuel gas electrochemically consumed, and controls gas flow into the combustion chamber by providing a pressure drop across the positioning gasket of from about 0.25 inches of water to 2.0 inches of water, where the fuel cell positioning gasket contains alumina and up to 40 wt. % silica and has a flexible laminate structure comprising at least a compliant fibrous mat layer and a flexible, woven layer facing the combustion chamber, where said woven layer is a nickel containing catalytic layer which promotes flameless combustion in the combustion chamber and provides a region where hydrogen fuel combustion would preferably occur, and where said gasket woven layer of the fuel cell positioning gasket protects the at least one open top of the fuel cells from localized burning of hydrogen, and the fuel cell positioning gasket is flexible and complies to accommodate variable cell bundle pitch.

2. The fuel cell generator of claim 1, wherein a lower fuel cell positioning board consisting essentially of a single layer of porous, low density alumina defines the bottom of the fuel recirculation chamber.

3. The fuel cell generator of claim 1, wherein the fuel cell positioning gasket mat support and woven layer are cemented, stitched or sewn together.

4. The fuel cell generator of claim 1, wherein the fuel cells fit tightly through perforations in the fuel cell positioning gasket, the feed oxidant is air, and the fuel cell positioning gasket is soft and compliant yet closely gaskets the fuel cells so that exhaust spent fuel permeation into the combustion chamber is controlled, and where materials used for the gasket have porosities of 90-99 vol. % allowing gas to diffuse evenly through it.

5. The fuel cell generator of claim 1, wherein the laminate structure of the gasket also contains a woven un-catalyzed layer facing the fuel recirculation chamber, where the gasket is flexible even in the initial state, allowing ease of installation over bundle rows.

6. The fuel cell generator of claim 1, wherein the gasket has perforations there through to accommodate the fuel cells, and also flow holes to allow gas diffusion.

7. The fuel cell generator of claim 1, wherein the gasket is of a sewn pillow configuration.

* * * * *